April 2, 1968 W. K. KOLSTER 3,375,973

DATA APPARATUS

Filed June 15, 1965

9 Sheets-Sheet 1

INVENTOR
WILHELM K. KOLSTER
BY
Robertson Smythe & Bryan
ATTORNEYS

April 2, 1968 W. K. KOLSTER 3,375,973

DATA APPARATUS

Filed June 15, 1965

9 Sheets-Sheet 2

INVENTOR
WILHELM K. KOLSTER
BY
Robertson Smythe & Bryan
ATTORNEYS

April 2, 1968 W. K. KOLSTER 3,375,973

DATA APPARATUS

Filed June 15, 1965 9 Sheets-Sheet 3

INVENTOR
WILHELM K. KOLSTER
BY
Robertson Smythe & Bryan
ATTORNEYS

INVENTOR
WILHELM K. KOLSTER
BY
Robertson Smythe & Bryan
ATTORNEYS

INVENTOR
WILHELM K. KOLSTER
BY
Robertson Smythe & Bryan
ATTORNEYS

April 2, 1968 W. K. KOLSTER 3,375,973

DATA APPARATUS

Filed June 15, 1965 9 Sheets-Sheet 6

INVENTOR
WILHELM K. KOLSTER
BY
Robertson Smythe & Bryan
ATTORNEYS

INVENTOR
WILHELM K. KOLSTER
BY
Robertson Smythe & Bryan
ATTORNEYS

INVENTOR
WILHELM K. KOLSTER
BY
Robertson Smythe & Bryan
ATTORNEYS

INVENTOR
WILHELM K. KOLSTER
BY
Robertson Smythe & Bryan
ATTORNEYS

United States Patent Office 3,375,973

Patented Apr. 2, 1968

3,375,973

DATA APPARATUS

Wilhelm K. Kolster, Michigan City, Ind., assignor to Swiss Controls & Research, Inc., Michigan City, Ind., a corporation of Illinois Filed June 15, 1965, Ser. No. 464,125
6 Claims. (Cl. 234—59)

ABSTRACT OF THE DISCLOSURE

A data selecting and recording apparatus that will permit the user thereof to select various bits of data from any one of a plurality of columns of an indexical master list, and to record that data as punched holes in a card capable of being fed through a totalizing machine.

This invention relates to data selecting and recording apparatus and particularly to such apparatus in which data mounted on a drum can be selected and the selection permanently recorded on cards such as IBM cards and the like.

While the principles of the invention are applicable to any type of data selecting and recording apparatus, they will be shown and described as applied to a voting machine.

The principal object of the present invention is to provide a data selecting and recording apparatus that will permit a user to select various bits of data from any one of a plurality of columns of an indexical master list, and to record that data as punched holes in a card capable of being fed through a totalizing machine.

Another object of the invention is to provide such an apparatus in which the card, only when inserted properly in the apparatus of this invention, triggers means which locks the card in the apparatus and indicates that the apparatus is in condition for use.

Still another object of the invention is to provide such an apparatus in which novel means is provided for indexing the card each time the master list is indexed to a new column of data.

Another object of the invention is to provide such an apparatus in which master list indexing is accomplished with interlocks to ensure complete indexing before punching can be effected.

A further object of the invention is to provide such an apparatus in which the punch for punching the card cannot be operated if the punch is mislocated relative to data on the master list or if the record receiving card is not in its proper and locked position.

A still further object of the invention is to provide such an apparatus in which selected data indicia that are effective each time the punch is operated are cleared by the indexing of the master list.

Another object of the invention is the provision of such apparatus in which punch amplifying means is provided for ensuring a perfect punched hole in the recording card.

In one aspect of the invention, a housing may support a drum capable of being indexed in a step-by-step fashion about a horizontal axis. The drum may be provided with a removable master list that wraps around the drum. The master list may include circumferentially spaced columns of data arranged parallel to the drum axis.

In another aspect of the invention, a carriage may be mounted within the housing adjacent the drum for movement along a path parallel to the drum axis. A punch mechanism may be mounted on the carriage and it may be provided with a pointer indicating the position of the punch relative to data in the columns of the master list.

In still another aspect of the invention, there may be provided indicia in the form of a tab or flag that becomes visible each time that a selection and punching operation is made. Upon the indexing of the drum to the next column of the master list, all visible flags are retracted.

In another aspect of the invention, two captive or double track type cams are connected to the indexing drum, one of which effects the lateral indexing of the record card for each index position of the drum, and the other of which renders a second punch effective half way through the index cycle of the drum simultaneously with reverse lateral indexing of the card, so that two punches in each block on the record card refer to data in separate columns on the master list.

In a further aspect of the invention, a card carriage may be provided, adapted slidingly to receive the record card. When a card is completely inserted in the card carriage, tripping means is activated to effect the gripping and locking of the card in proper position. At the same time, an indicating lever is actuated, indicating that the apparatus is in condition to operate (vote).

In a still further aspect of the invention, means may be provided to interfere with the punching operation until the record card is in proper position in its carriage, whereupon means is actuated to release the mechanism interfering with the punch operation.

In another aspect of the invention, the carriage for the punch may include mechanism to ensure that the punch is correctly aligned with a selected bit of information on the master list. This mechanism may respond to the movement of the punch and effect limited punch carriage movement to correct alignment errors.

In another aspect of the invention, various interlocking means may be provided to ensure complete indexing of the drum before a selection and punching can be effected.

In still another aspect of the invention, there may be means for clearing the flag indicators during the release of the record card after the last selection and punching have been completed.

The above, other objects and novel features of the invention will become apparent from the following specification and accompanying drawings which are merely exemplary.

Figure 3:
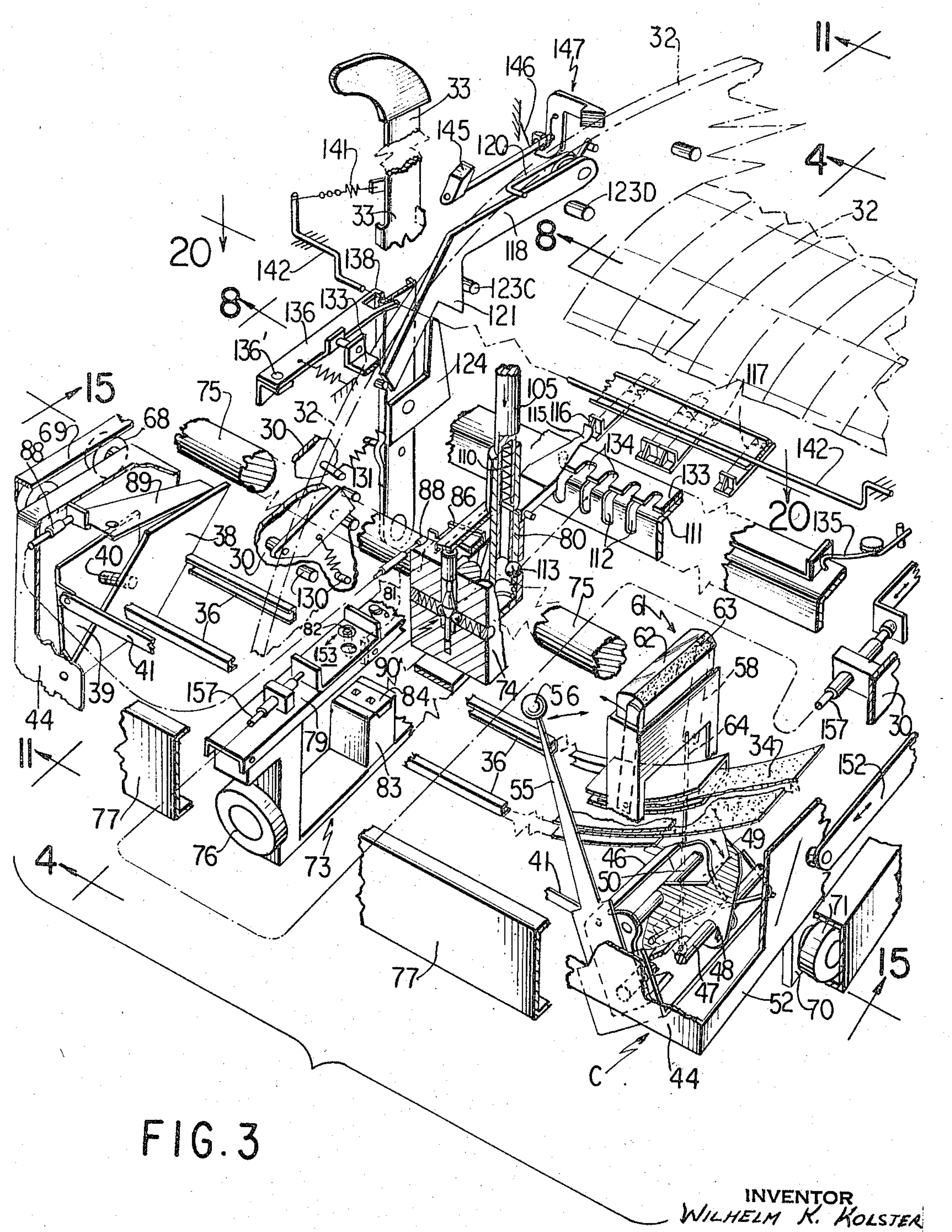
FIG. 3 is a perspective exploded view of the apparatus within the machine of FIG. 1.
Figures 11, 12, 13:
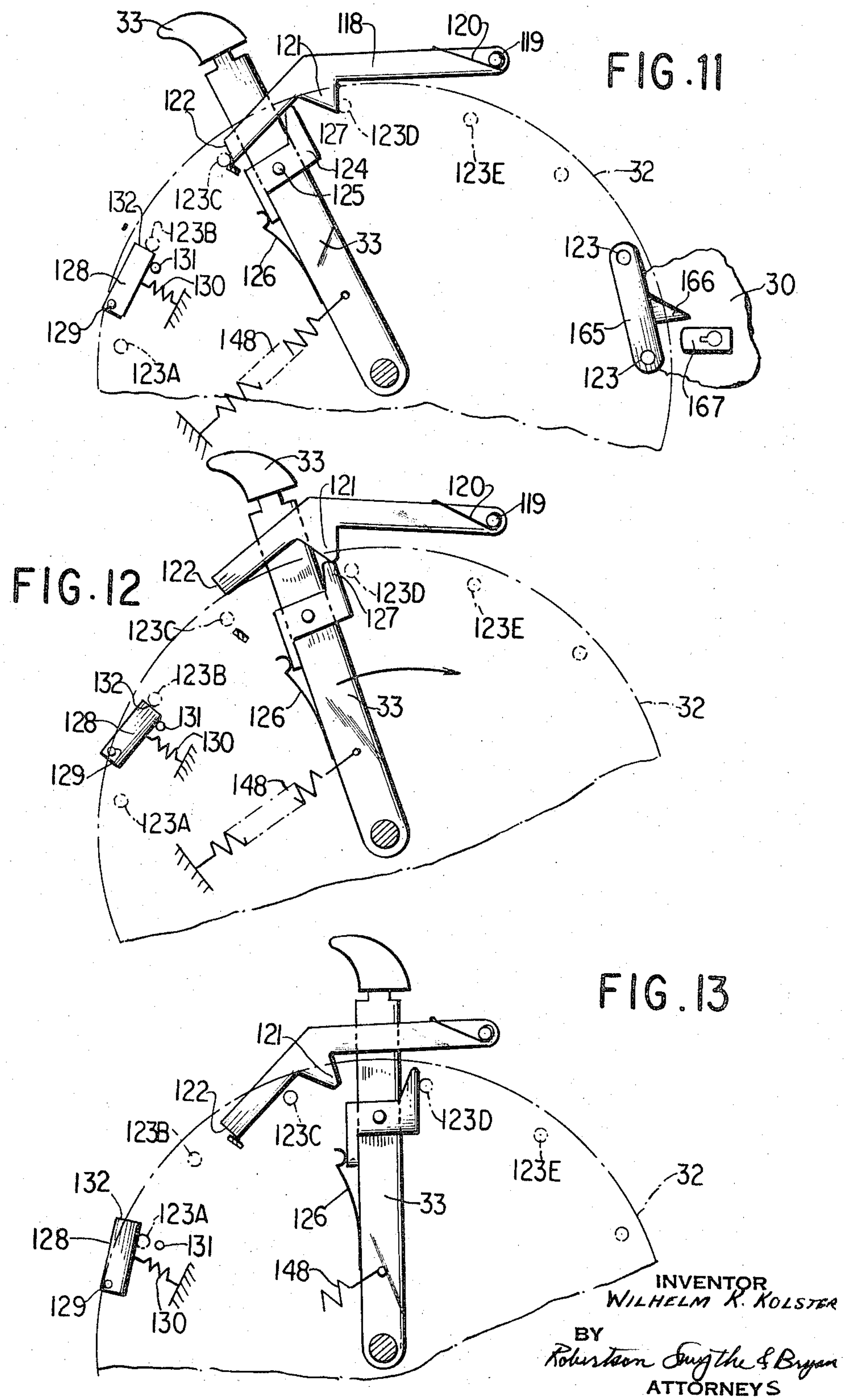
FIG. 11 is an elevational view taken along line 11—11 of FIG. 3.
Figure 14:
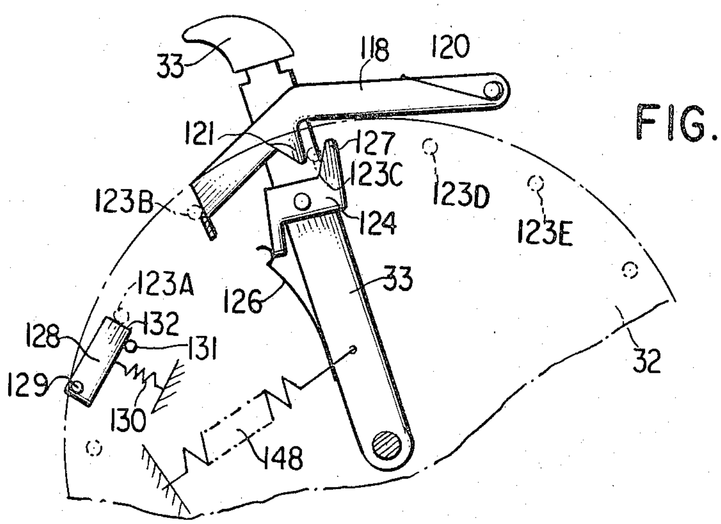
Figures 20, 21, 22, 23:
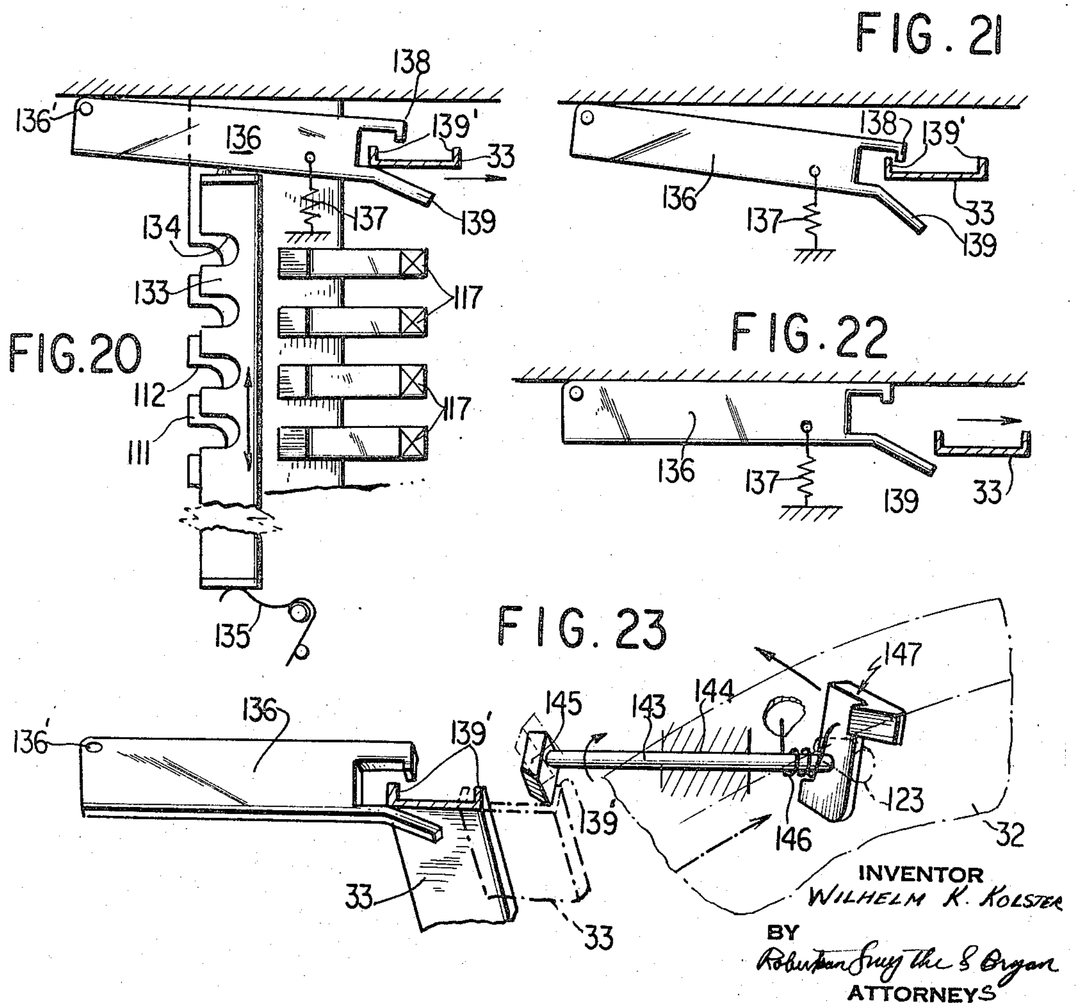
Figures 15, 17, 18:
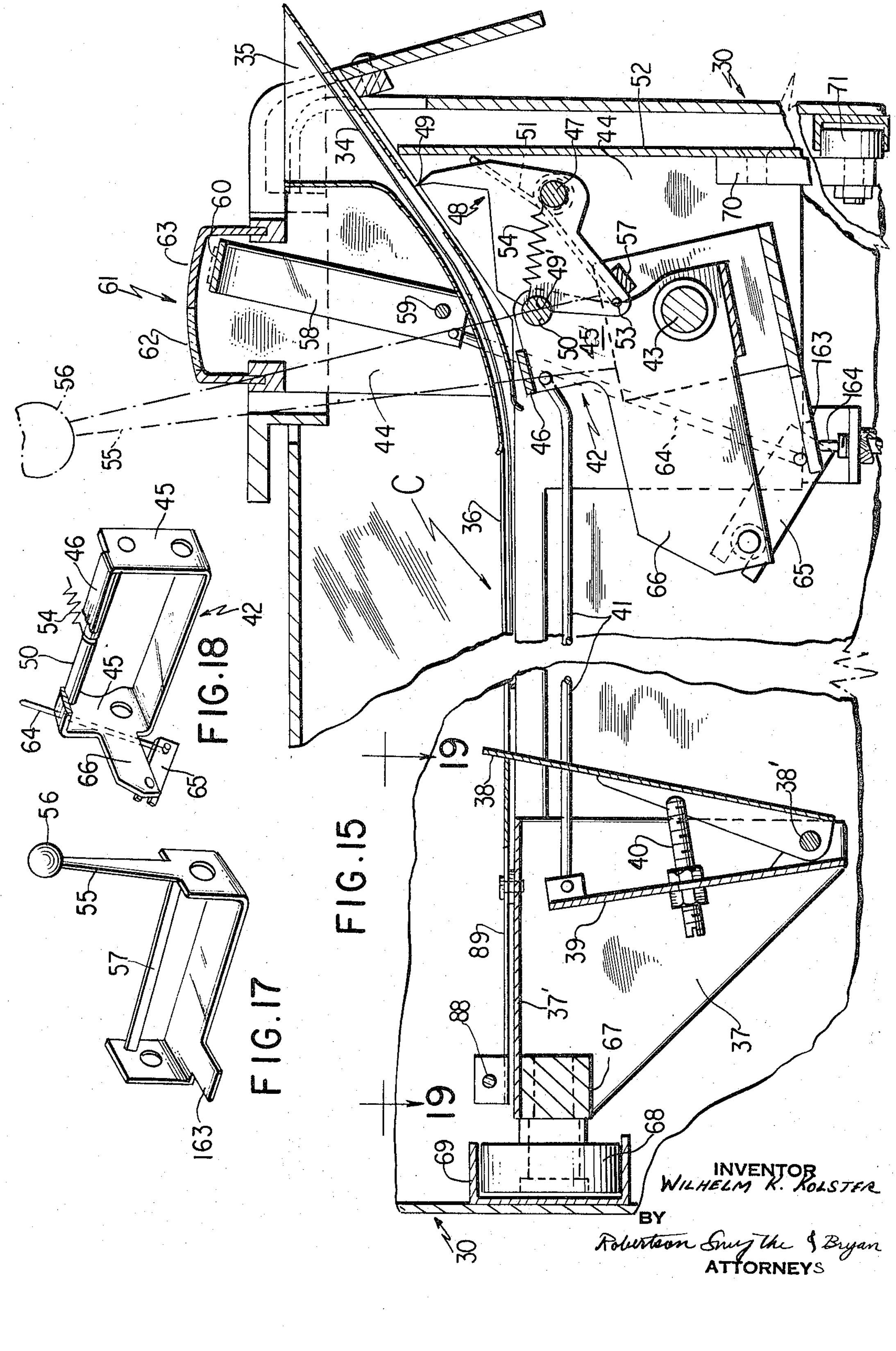
Figures 16, 24, 25:
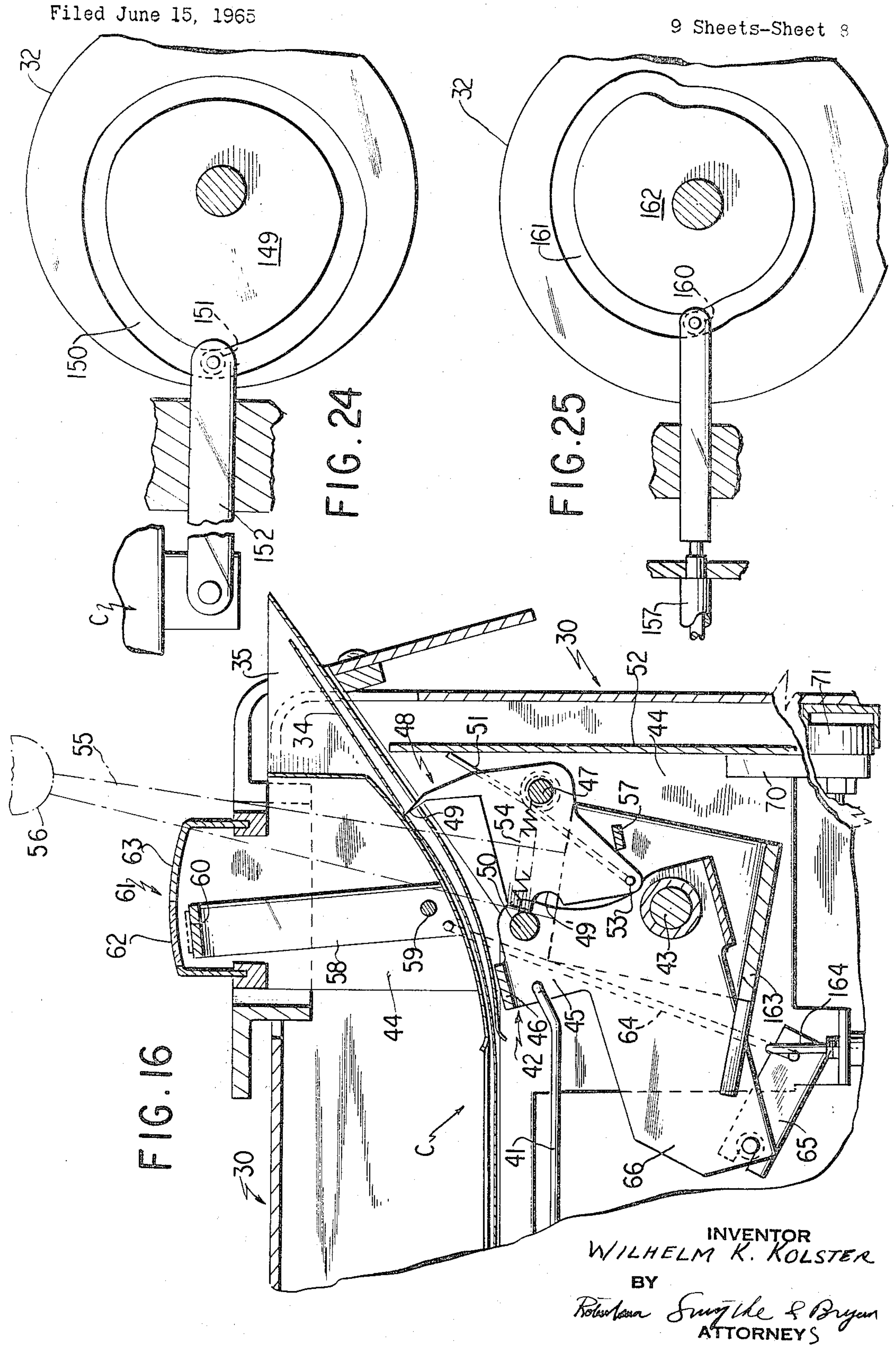
Figure 19:
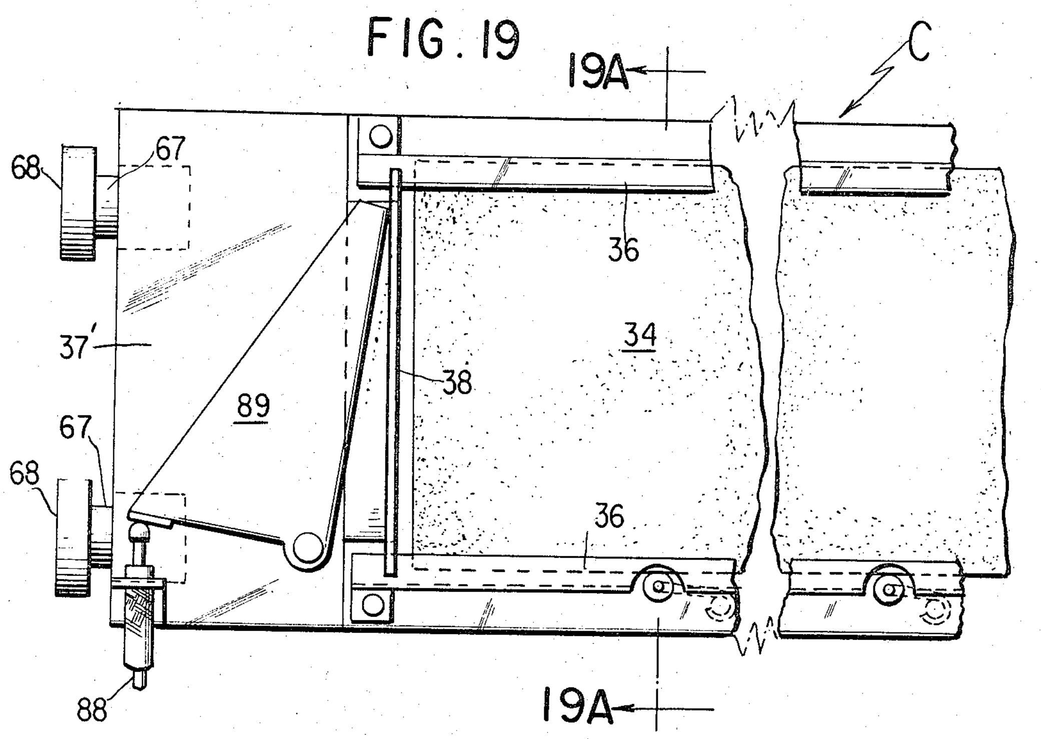
Figure 19A:
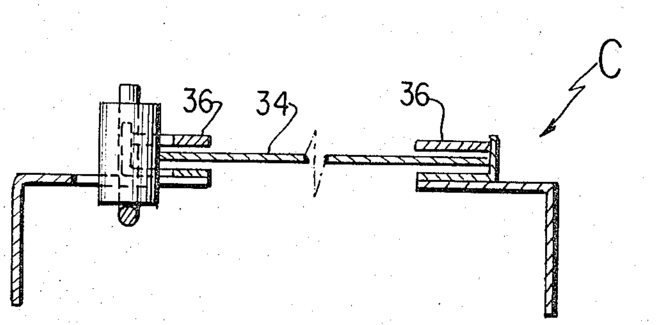

FIGS. 12, 13, and 14 are views of portions of the apparatus of FIG. 11 in different operative positions;

FIG. 15 is an elevational view, partly in section, taken substantially along line 15—15 of FIG. 3;

FIG. 16 is a view of part of the apparatus shown in FIG. 15 but in a different operative position;

FIGS. 17 and 18 are details of the apparatus shown in FIGS. 15 and 16;

FIG. 19 is a plan view taken substantially along line 19—19 of FIG. 15;

FIG. 19A is a sectional view taken substantially along line 19A—19A of FIG. 19;

FIG. 20 is a plan view along line 20—20 of FIG. 3;

FIGS. 21, 22 and 23 are details of the apparatus shown in FIGS. 3 and 20; and

FIGS. 24 and 25 are elevational views of two cams that are fixed to, and indexed with the data-containing drum.

Figures 1, 1A, 2:
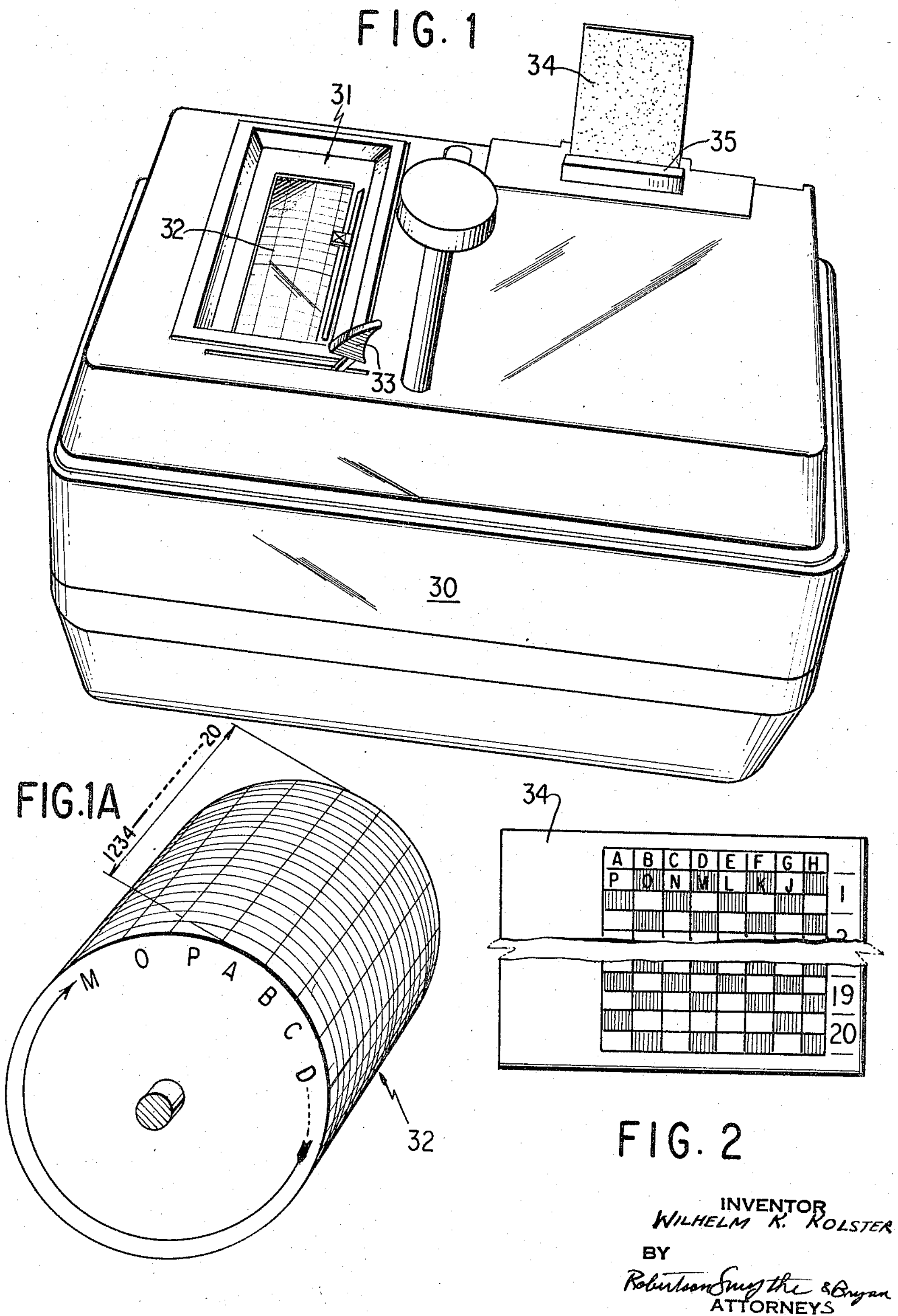
FIG. 1 is a perspective view of a voting machine to which the principles of the invention have been applied.
FIG. 1A is a perspective view of a drum forming an element of the invention.
FIG. 2 is a view of a card employed with the apparatus shown in FIG. 1.

Referring to the drawings, and particularly to FIGS. 1, 2 and 3, the principles of the invention are shown as applied to a voting machine, although the use to which the apparatus is put is immaterial. The apparatus shown in FIG. 1 includes a housing 30 having a window 31 in its top wall through which a drum 32 is visible, the drum 32 being mounted within housing 30 for rotary movement about a horizontal axis so that it can be indexed in a step-by-step fashion by the reciprocation of a hand lever 33.

Referring to FIG. 1A, the drum 32 may include a plurality of index stations identified in the embodiment disclosed by letters A to H and J to P. Each of these stations presents a separate column lying on the periphery of drum 32 parallel to the axis of rotation of drum 32. The axial columns are divided into circumferentially extending, axially spaced columns identified in the embodiment disclosed as numbers 1 to 20. The intersection of both sets of columns produces three hundred blocks of data, each of which can be selected with the apparatus to be described later.

A record card 34 may be fed into the housing 30. Referring to FIG. 2, it may comprise a plurality of horizontal, longitudinally spaced columns identified by numbers 1 to 20 corresponding to the twenty columns on the drum 32. Each of the 1–20 columns may be divided in two so that the letters A to H appear in the upper half of each numbered column and J to P appear in reverse order in the lower half. This arrangement permits the use of a card 34 of minimum width. From the foregoing it is evident that card 34 includes three hundred blocks that correspond to the three hundred blocks on drum 32.

Referring to FIGS. 3, 15, 16 and 19, the card 34 is adapted to be fed into a card holder C in the housing 30 through a mouthpiece 35 that is connected to channel-shaped tracks 36 that lie above an anvil of a punch mechanism to be described later. The tracks 36 terminate at spaced brackets 37 (FIG. 15), depending from each track 36 and connected by a horizontal plate 37'. A plate 38 pivoted on a shaft 38' between brackets 37' extends above the tracks 36 so that as the leading end of card 34 contacts plate 38, it pivots about shaft 38' in a counterclockwise direction. Another plate 39 pivoted on shaft 38' includes an adjustable abutment means 40 that is struck by plate 38 as it is turned counterclockwise by the leading end of card 34.

The plate 39 has fixed to its end opposite that pivoted on shaft 38', rods 41 at each edge of plate 39. The rods 41 extend along and beneath the spaced tracks 36 and are connected at their ends opposite plate 39 to a bracket 42 (FIGS. 15, 16) that is pivotally mounted on a shaft 43 that extends between spaced, parallel side walls 44 (only one being shown) which form part of the subframe for the record card carriage.

The bracket 42 includes spaced parallel legs 45 joined at the top by a bar 46. The legs 45 are pivoted on shaft 43. A bar 47 extends between walls 44 and pivotally supports a gripper element 48 having a serrated knife edge 49 having teeth therealong adapted to pass upwardly through mouthpiece 35 to grip card 34 and force it leftwardly slightly when element 48 is in the position shown in FIG. 16, thereby to securely grip the card and hold it in a fixed position. Element 48 also includes a notch 49' adapted to receive shaft 50 when the two are moved into alignment with each other. A spring 51 is coiled about bar 47, with one of its ends resting against a back wall 52 joining side walls 44 and its other end connected to element 48 at point 53. A tension spring 54 connects bar 47 and shaft 50. A hand lever 55 includes a knob 56 on one end and is pivoted at its other end on shaft 43. It includes an abutment 57 adapted to cooperate with element 48. The construction is such that with the parts in the condition shown in FIG. 15, i.e., with hand lever 55 in a forward position, abutment 57 turns element 48 clockwise about bar 47, applying torsion to spring 51 and so that notch 49' is aligned with shaft 50, whereupon spring 54 pulls shaft 50 into notch 49', turning bracket 42 clockwise about shaft 43 thereby holding element 48 cocked with spring 51 under torsion and with knife edge 49 retracted from within mouthpiece 35. In this condition, a card 34 can be inserted in mouthpiece 35 and slid along tracks 36 until its leading end contacts plate 38, turning it counterclockwise about pivot shaft 38', drawing rods 41 leftwardly (FIG. 15) and turning bracket 42 counterclockwise about shaft 43. This releases shaft 50 from notch 49'', whereupon spring 51 turns element 48 counterclockwise about bar 47 so that the parts assume the positions shown in FIG. 16 with knife edge 49 extending into mouthpiece 35, firmly gripping card 34 and restraining it from being withdrawn.

In order to indicate that the card 34 is in proper position, a lever 58 is pivoted on a shaft 59 extending between side walls 44 and which lever includes a plate 60 containing a notation that the apparatus is in condition to operate. A shield 61 extends over the plate 60 and includes a portion 62 that is transparent and another portion 63 that is nontransparent. A link 64 has one of its ends connected to lever 58, offset from shaft 59, and its other end attached to a link 65 that in turn is connected to an extension 66 of one of the legs 45 of bracket 42. The construction is such that with the parts in the condition shown in FIG. 15, plate 60 is hidden from view, and with the parts in the position shown in FIG. 16, plate 60 is visible.

Referring to FIGS. 15 and 19, plate 37' supports spaced bearings 67 journaling rollers 68 adapted to ride in a track 69 fixed to housing 30. A plate 70 depending from back wall 52 may support spaced rolls 71 adapted to ride along a track within housing 30 to permit movement of the carriage supporting card 34 transversely of its longitudinal dimension, as will be explained later.

Figure 4:
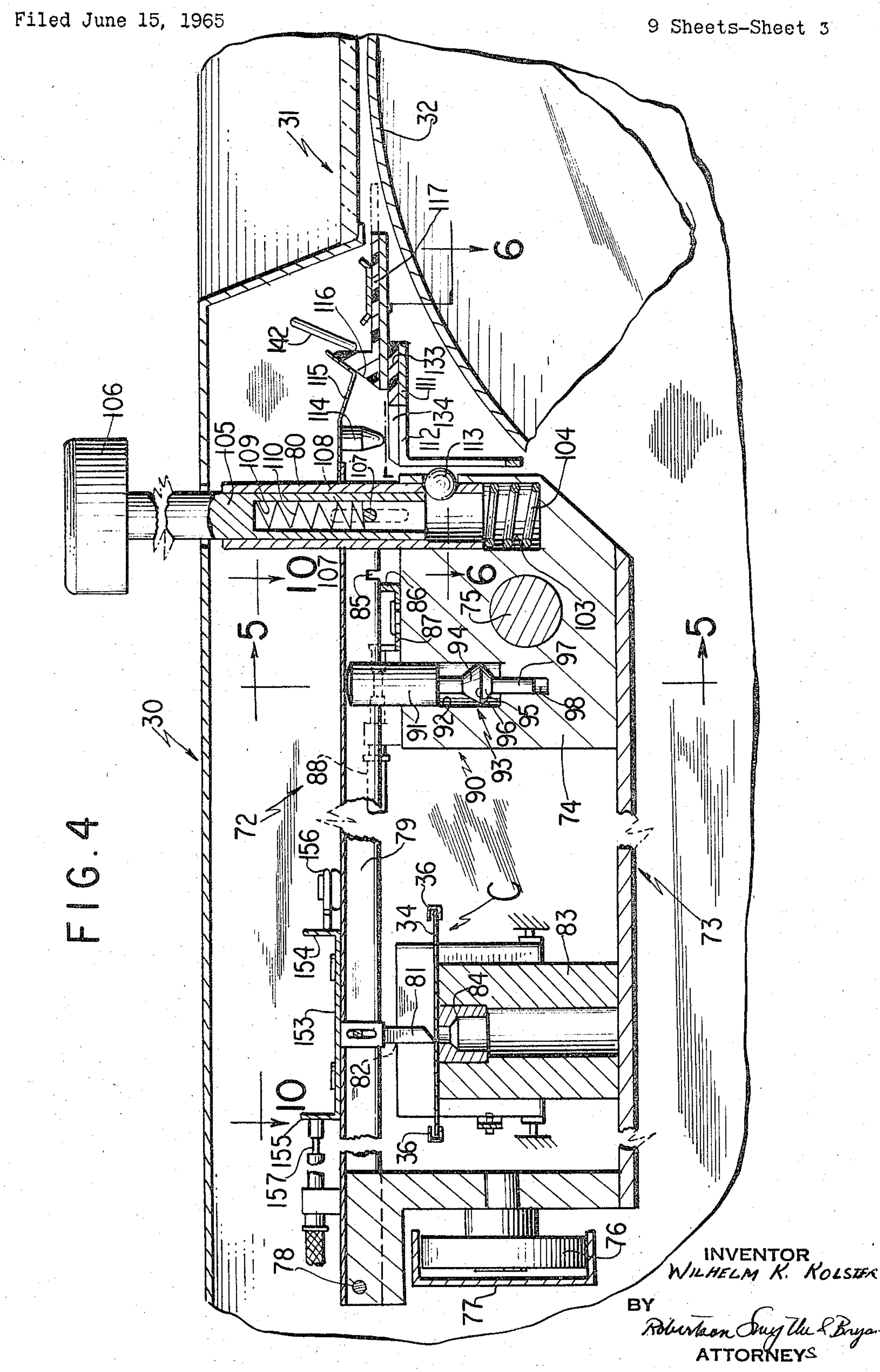
FIG. 4 is a sectional elevational view taken substantially along line 4—4 of FIG. 3.

Referring to FIGS. 3 and 4, and particularly FIG. 4, punching mechanism 72 may be supported by a base 73 having a block 74 slidingly mounted on a bar 75 extending between the side walls of housing 30. Base 73 also supports rolls 76 that ride in track means 77 within housing 30. Track means 77 and bar 75 are parallel with each other as well as with the axis of drum 32.

The base 73 pivotally supports at 78 a lever 79 having a vertically disposed tubular element 80 near its end opposite the pivot point 78. Lever 79 supports two spaced, transversely aligned punches 81 and 82 (FIG. 3), beneath which an anvil 83 is mounted on base 73, which anvil supports a die 84. The arrangement of punches 81, 82 and die 84 is such that card 34 rests on die 84 beneath punches 81, 82. Only one of the punches 81, 82 will be effective at a time, as will be explained later.

The base 73 together with punching mechanism 72 is moved along bar 75 and track means 77 longitudinally of the card 34 so that punches 81, 82 will lie over a block on card 34 that corresponds to a peripheral column on drum 32 represented by the numerals 1 through 20 (FIG. 1A). In order to ensure that the punches 81 and 82 are properly aligned with the correct column 1–20 on drum 32 and the corresponding block on card 34, certain interlocking mechanism is provided. Thus, lever 79 includes a notch 85 that is shown in FIG. 4 as being misaligned with a flange 86 on a shiftable element 87. Element 87 is connected to one end of a shutter release wire 88, the opposite end of which is acted on by a lever 89 (FIG. 19)

pivoted on plate 37' of the carriage for card 34. Accordingly, when card 34 is in proper position, as previously explained, its leading end contacts and pivots the plate 38 which thereby pivots lever 89 acting on shutter release 88 to shift element 87 rightwardly (FIG. 4) so that flange 86 thereon aligns with notch 85, thereby permitting the movement of lever 79 downwardly to render punches 81, 82 effective.

Lever 79 is restrained from being forced downwardly by a spring detent means 90. The purpose of detent means 90 is to ensure that lever 79 is subjected to enough force before the punches 81, 82 descend so that either punch moves downwardly sufficiently fast to provide a neat punched hole in the card 34. To this end, detent means 90 may comprise a cylindrical plunger 91 mounted within a bore 92 in block 74 for vertical reciprocation. The lower end of plunger 91 may include a compound cam 93 including an inclined surface 94 and a reversely inclined surface 95 joining each other by a ridge 96. The plunger 91 may terminate in a stem 97 reciprocable in a bore 98 aligned with bore 92.

Figures 5, 6, 7, 8, 9:
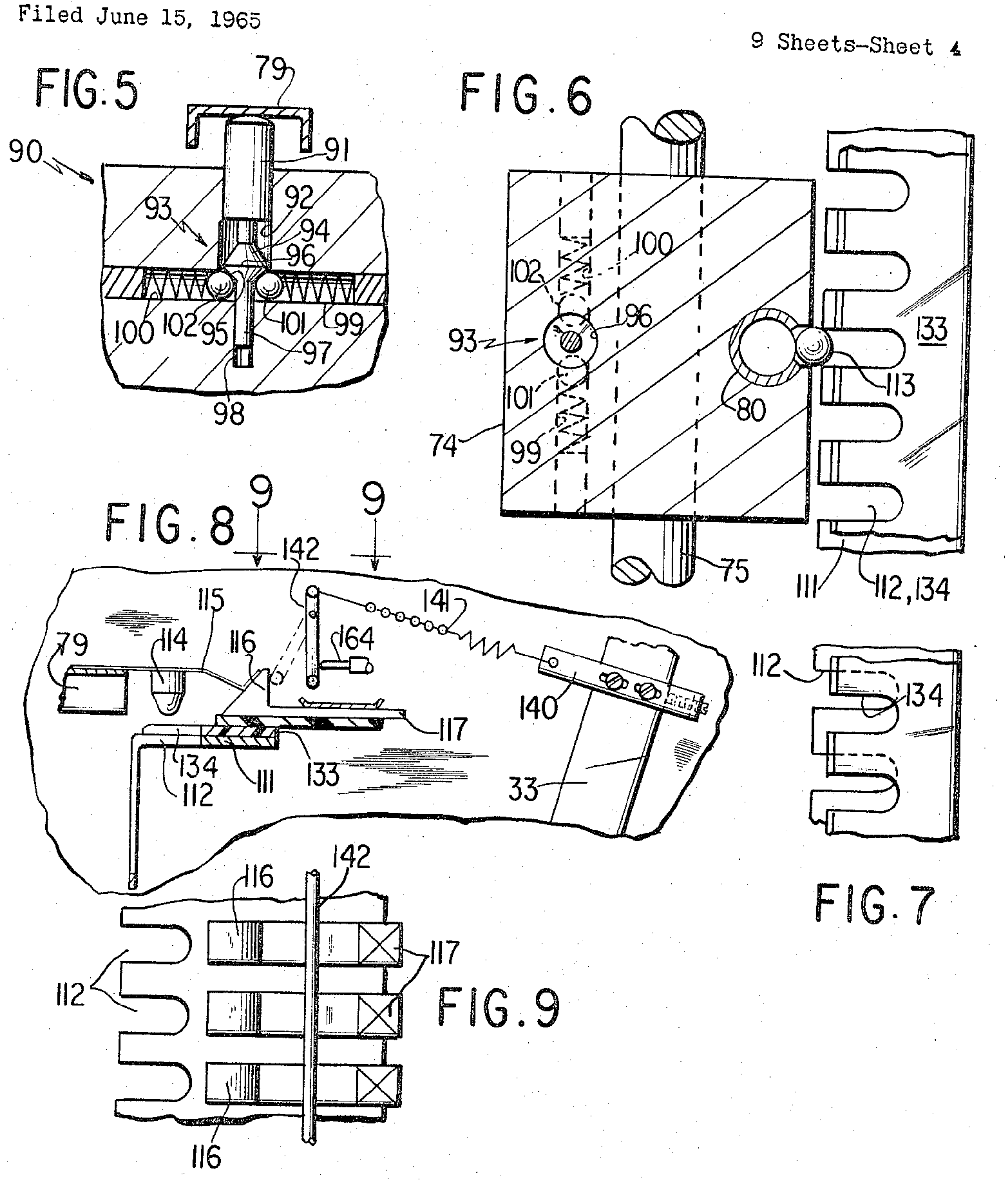
FIG. 5 is a sectional elevational view taken substantially along line 5—5 of FIG. 4.
FIG. 6 is a sectional plan view taken substantially along line 6—6 of FIG. 4.
FIG. 7 is a portion of the apparatus shown in FIG. 6 in a different position.
FIG. 8 is a sectional elevational view taken substantially along line 8—8 of FIG. 3.
FIG. 9 is a plan view taken substantially along line 9—9 of FIG. 8.

Referring to FIG. 5, radial passages 99 and 100 include spring pressed balls 101, 102 that are urged against stem 97 normally beneath the ridge 96. The tubular element 80 is integral with lever 79 and extends below as well as above it. Its lower end fits within a bore 103 in block 74 and rests on a compression spring 104.

A plunger 105 is slidingly received within the tubular element 80 and it includes a head 106 to be pressed by the operator. A pin 107 extends across the side walls of lever 79, through element 80, and rides in diametrically opposed slots 108 in the walls of plunger 105 formed by a recess 109 therein. A spring 110 in recess 109 acts against the top of recess 109 and the pin 107. Accordingly, forcing plunger 105 downwardly comprises spring 110 without moving lever 79 downwardly until enough power is stored up in spring 110 to overcome the spring pressed balls 101, 102 acting on cam surface 95 which may make a 30° angle with the horizontal. When balls 101, 102 are forced radially away from cam 93 and past ridge 96, they act on cam surface 94 which may make an angle of 60° with the horizontal. This will snap the plunger 91 downwardly away from lever 79 so that the stored-up power in spring 110 will snap lever 79 downwardly to make punches 81 or 82 cut a sharp hole in card 34. This downward movement of lever 79 compresses spring 104 so that after the punching operation is completed, lever 79 will be returned to the position shown in FIG. 4.

However, there are other elements that prevent the moving of lever 79 down to effect a punching operation. Thus, an angle position bar 111 may be mounted within housing 30 over drum 32. It may include a separate slot 112 for each of the twenty circumferentially extending columns on drum 32. A ball 113 may be provided within a recess in the depending portion of tubular element 80 such that it will interfere with the downward movement of plunger 105 unless ball 113 is aligned with a slot 112, in which case it moves into such a slot and locks the position of base 73 to the position bar 11, so that actuation of punches 81 or 82 will produce a hole in a block on card 34 that corresponds with the data on drum 32 aligned with the slot 112 in which ball 113 has been forced.

There is another interlock that controls the punch actuation. It comprises a tapered pin 114 on the end of lever 79 opposite pivot point 78, to be described later. A flat spring 115 is also connected to this end of lever 79 and it is formed to provide a camming action against each of twenty slidable members 116 that are located in grooves aligned with slots 112. Each member 116 includes a forwardly extending portion 117 that acts as an indicating flag and is observable through window 31 of housing 30 in line with data on drum 32. When a punching operation is made, the flat spring 115 acts on the inclined surface of member 116 in the groove aligned with the slot 112 receiving ball 113 and forces member 116 rightwardly (FIG. 4) so that flag 117 thereof is visible through window 31.

From the foregoing it is evident that sliding base 73 along bar 75 and operating plunger 105 at selected of the circumferential columns A to P on drum 32 will cause holes to be punched in card 34 in blocks corresponding to the axially extending columns 1 to 20 on drum 32, and that flags 117 indicate to the user the selections made in said axially extending columns 1 to 20.

When selections and punchings have been accomplished for column A, it is necessary to index drum 32 to column B and correspondingly to index the carriage for card 34 to the next longitudinally extending row of blocks thereon. Indexing of drum 32 is effected by the reciprocation of hand lever 33.

Referring to FIG. 11, a pawl 118 is pivoted within housing 30 on a pin 119. A torsion spring 120 on pin 119 acts to bias pawl 118 in a counterclockwise direction about pin 119. Pawl 118 includes a cam and stop 121 as well as an end stop 122. They are spaced so that the two stops contact adjacent pins 123 (such as 123C and 123D) arranged about the periphery of drum 32 for indexing the same.

A ratchet 124 is pivoted to lever 33 on a pin 125 and is resiliently held in the position shown in FIG. 11 by a leaf spring 126 on lever 33. Movement of lever 33 in a clockwise direction causes a portion 127 of pawl 124 to act on the cam stop 121, raising stops 121 and 122 clear of the pins 123C and 123D against the action of spring 120 (FIG. 12). Continued clockwise movement of lever 33 causes 127 to engage pin 123D, moving it to the position of pin 123E, advancing all other pins 123 and, of course, indexing drum 32 to its next position (FIG. 13).

In order to prevent counterclockwise motion of drum 32 during indexing and the return to rest position of lever 33, a pawl 128 pivoted at 129 in housing 30 is provided. Normally, a spring 130 maintains pawl 128 against a stop 131 so that its end 132 contacts a pin 123. During indexing of drum 32, however, the following pin 123A raises pawl 128 so it can pass to a point ahead of pawl 128 when the latter moves into rest position, engaging the new pin 123.

However, certain conditions must be satisfied before lever 33 can be moved from its rest position (FIG. 12) to index drum 32. Thus, an interlock is provided for preventing the movement of lever 33 during a punching operation. This interlock operates while the car 34 is being punched to prevent movement of drum 32 and the holder for card 34, thus preventing mutilation of the card 34.

To accomplish this, an arrest bar 133 (FIG. 20) lies on, and slides along position bar 111 (see also FIG. 4). Arrest bar 133 includes slots 134 of the same size as slots 112 in bar 111. A spring 135 urges bar 133 in a direction moving a lever 136 counterclockwise about a pivot 136' against the action of a spring 137, which spring is of less force than spring 135. The lever 136 includes a hook 138 and a cam lip 139. In the rest position, lip 139 engages lever 33 with slots 134 and 112 misaligned. Upon depression of the punch lever 79 (FIG. 4), pin 114 penetrates slots 134, 112, moving the end of bar 133 away from lever 136 so that spring 137 moves it clockwise about pivot 136', whereupon hook 138 interlocks with a flange 139' on lever 33 (FIG. 21), preventing its movement. Upon release of the punch lever 79, pin 114 rises above bar 133, whereupon spring 135 moves it in a manner to pivot lever 136 counterclockwise so that lever 33 can move rightwardly (FIG. 22) to index drum 32.

Referring to FIG. 20, if lever 33 has not returned to its rest position as shown in FIG. 20 (i.e., has not completed a full drum movement), then lever 136 moves counterclockwise until restricted by wall of housing 30 as shown in FIG. 22. In this position, bar 133 (FIG. 20) moves upwardly until stopped by the ridge of lever 136. In this position, the slots 112 of bar 111 are completely covered by the parts between slots 134 of sliding bar 133 thus preventing pin 114 (FIG. 4) from penetrating and so preventing punch lever 79 being actuated and punching misaligned holes.

In order to reset all of the flags 117 during indexing of drum 32, a bracket 140 (FIG. 8) is resiliently connected through a chain and spring 141 to a pivoted plate 142. Plate 142 extends laterally across the members 116. Thus, as the lever 33 moves clockwise, plate 142 pivots counterclockwise so as to return all extending members 116 and their flags 117 to rest position.

In order to prevent the return of the lever 33 until the drum 32 has made a complete index, a shaft 143 (FIG. 23) is mounted in a bearing 144 for oscillatable motion. One end of shaft 143 has fixed to it a latch 145 that will turn shaft 143 against the action of a torsion spring 146. Spring 146 has one end anchored on a stationary support and its other end fixed to a latch 147 that is attached to the end of shaft 143 opposite that supporting latch 145. The latch 147 is in line to be acted on by each pin 123 on drum 32 as the latter is indexed. The construction is such that upon moving lever 33 clockwise insufficiently to completely index drum 32, latch 145 catches onto a flange 139 of lever 33, preventing its return motion to rest position. However, if the indexing of drum 32 is complete, a pin 123 will act on latch 147, turning latch 145 to a position where it will not latch onto lever 33, and hence can be returned to rest position.

Referring to FIG. 14, a spring 148 returns lever 33 to rest position. As lever 33 moves counterclockwise, ratchet 124 pivots clockwise against leaf spring 126 to clear pin 123 and cam 121.

During indexing of drum 32, card holder C must be moved laterally in one direction seven successive steps, one for each of seven indexes of drum 32; then during the next seven indexes of drum 32, card holder C is moved back to its starting point step-by-step. Referring to FIGS. 24, 25 and 19A, the axle of drum 32 supports a cam 149 having a captive groove 150 thereon. A cam follower 151 within groove 150 is connected to a rod 152, which in turn extends to and is connected to card holder C. The form of cam groove 150 is such that during the first seven indexes of drum 32, card 34 is moved laterally seven positions; and during the next seven indexes, card holder C is returned, step-by-step, to its starting point.

Figure 10:
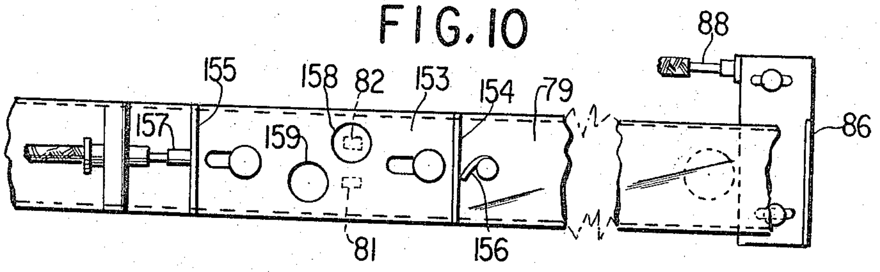
FIG. 10 is a plan view taken substantially along line 10—10 of FIG. 4.

During the first seven indexes of drum 32, punch 81 (FIG. 3) is to be effective. During the next or eighth index, means is rendered effective to de-activate punch 81 and to activate punch 82. Referring to FIGS. 3, 4, and 10, a plate 153 is mounted on the top of punch lever 79 for limited movement. It includes flanges 154, 155. A spring 156 on lever 79 acts on flange 154, biasing plate 153 leftwardly (FIG. 4) so that its flange 155 contacts the end of a flexible cable 157.

Plate 153 (FIG. 10) includes two spaced holes 158, 159. Hole 158 is shown over punch 82 so that punch 81 is effective. Movement of plate 153 rightwardly by the action of cable 157 will move hole 159 over punch 81 and cover punch 82, rendering the latter effective.

Cable 157 (FIG. 25) is connected to a follower 160 that rides in a captive cam groove 161 of a cam 162 also fixed to the axle of drum 32. The form of groove 161 is such that during the first seven indexes of drum 32, the punch 81 is effective; and during the ninth to the fourteenth index, the punch 82 is effective, the eighth index being employed to shift the plate 153 to render punch 82 effective and punch 81 ineffective; and the fifteenth index of drum 32 is employed to render punch 81 effective and punch 82 ineffective.

Referring to FIGS. 2 and 3, with drum 32 at its starting point, the AP column is in line with punches 81, 82 and punch 81 is effective so that punching mechanism 72 can be moved to any of the twenty positions along the bar 75 and a punched hole can be made in any selected A block. The first index of drum 32 aligns the BO column of card 34 with punches 81, 82 with punch 81 effective to punch holes in the B blocks. This continues until the seventh index of drum 32 aligns the H column of card 34 with punches 81, 82 and with punch 81 effective. On the eighth index of drum 32, card 34 reverses its movement so that the GJ column is aligned with punches 81, 82, but now punch 82 is effective to punch a hole in the J block. On the ninth index of drum 32, card 34 moves laterally so that the FK column is aligned with punches 81, 82, but with punch 82 effective to punch a hole in the K block. This continues until on the fourteenth index of drum 32, card 34 is moved so that the AP column is aligned with punches 81, 82 with punch 82 effective to punch block P. On the fifteenth index of drum 32, the cam groove 161 does not move card 34 but withdraws wire 157 (FIG. 4) so that spring 156 moves plate 153 to render punch 81 effective and punch 82 ineffective.

When the fifteenth index of drum 32 has been completed, the flags 117 for the user are still visible. In order to clear these flags prior to operation of the apparatus by the next user, means is provided for automatically clearing flags 117 upon release of the card 34. Thus, and referring to FIGS. 15, 16 and 3, movement of lever 55 from the position in FIG. 16 to that in FIG. 15 causes the bottom 163 of lever 55 to actuate cable 164. Cable 164 extends and is connected to crank 142 that extends across the faces of members 116, causing the latter to pivot clockwise (FIG. 8) to return all of the flags 117 to an unobservable position.

Referring to FIG. 11, a stop 165 may be removably attached to any two adjacent pins 123 on drum 32. Stop 165 may include a nose 166 that will engage a key-operated abutment 167 mounted in the wall of housing 30 in the path of movement of pins 123. This arrangement can be employed to limit the number of indexes of drum 32, requiring authorized personnel to operate the key-controlled abutment 167 to permit the indexing of drum 32 to its starting position.

Although the various features of the improved data selecting and recording apparatus have been shown and described in detail to fully disclose one embodiment of the invention, it will be evident that changes may be made in such details and certain features may be used without others without departing from the principles of the invention.

What is claimed is:

1. Data selecting and recording apparatus comprising in combination, a base; a drum mounted on said base and adapted to be indexed about a horizontal axis in a step-by-step fashion, said drum including columnar data at each index station thereof; punch means mounted on said base and adapted to be moved along a path parallel to the axis of rotation of said drum to be aligned with selected data in each column on said drum; a record card holder on said base including an entrance for receiving a record card adapted to be punched at a preselected location by said punch means to record selected data thereon; a pivotally mounted member located beneath the entrance to said card holder and having a knife edge and a latching recess thereon; resilient means normally urging said pivotally mounted member toward a pisition where said knife edge is effective; a pivotally mounted hand lever having an abutment adapted to contact said pivotally mounted member; a link pivoted on the pivot for said hand lever and including a latch; and resilient means biasing said latch toward said pivotally mounted member, whereby when said hand lever is moved in one direction, the abutment thereon pivots the pivotally mounted member until the latching recess on the latter receives said latch.

2. Data selecting and recording apparatus comprising in combination, a base; a drum mounted on said base and adapted to be indexed about a horizontal axis in a step-by-step fashion, said drum including columnar data at each index station thereof; punch means mounted on said base and adapted to be moved along a path parallel to the axis of rotation of said drum to be aligned with selected data in each column on said drum; a record card holder on said base including an entrance for receiving a record card adapted to be punched at a preselected location by said punch means to record selected data thereon; a pivotally mounted member located beneath the entrance to said card holder and having a knife edge and a latching recess thereon; resilient means normally urging said pivotally mounted member toward a position where said knife edge is effective; a pivotally mounted hand lever having an abutment adapted to contact said pivotally mounted member; a link pivoted on the pivot for said hand lever and including a latch; resilient means biasing said latch toward said pivotally mounted member, whereby when said hand lever is moved in one direction, the abutment thereon pivots the pivotally mounted member until the latching recess on the latter receives said latch; and means responsive to a record card being inserted properly in said card holder for withdrawing said latch to cause the knife edge of said pivotally mounted member to grip said card.

3. In a data recording apparatus, a record card holder comprising in combination, a table having tracks on each side thereof; an entrance end on said table; a pivotally mounted member located beneath the entrance to said card holder and having a knife edge and a latching recess thereon; resilient means normally urging said pivotally mounted member toward a position where said knife edge is effective; a pivotally mounted hand lever having an abutment adapted to contact said pivotally mounted member; a link pivoted on the pivot for said hand lever and including a latch; and resilient means biasing said latch toward said pivotally mounted member, whereby when said hand lever is moved in one direction, the abutment thereon pivots the pivotally mounted member until the latching recess on the latter receives said latch.

4. In a data recording apparatus, a record card holder comprising in combination, a table having tracks on each side thereof; an entrance end on said table; a pivotally mounted member located beneath the entrance to said card holder and having a knife edge and a latching recess thereon; resilient means normally urging said pivotally mounted member toward a position where said knife edge is effective; a pivotally mounted hand lever having an abutment adapted to contact said pivotally mounted member; a link pivoted on the pivot for said hand lever and including a patch; resilient means biasing said latch toward said pivotally mounted member, whereby when said hand lever is moved in one direction, the abutment thereon pivots the pivotally mounted member until the latching recess on the latter receives said latch; and means responsive to a record card being inserted properly in said card holder for withdrawing said latch to cause the knife edge of said pivotally mounted member to grip said card.

5. In a data recording apparatus, a record card holder comprising in combination, a table having tracks on each side thereof; an entrance end on said table; a pivotally mounted member located beneath the entrance to said card holder and having a knife edge and a latching recess thereon; resilient means normally urging said pivotally mounted member toward a position where said knife edge is effective; a pivotally mounted hand lever having an abutment adapted to contact said pivotally mounted member; a link pivoted on the pivot for said hand lever and including a latch; resilient means biasing said latch toward said pivotally mounted member, whereby when said hand lever is moved in one direction, the abutment thereon pivots the pivotally mounted member until the latching recess on the latter receives said latch; and indicating means rendered effective by the action of said gripping means.

6. In a data recording apparatus, a record card holder comprising in combination, a table having tracks on each side thereof; an entrance end on said table; a pivotally mounted member located beneath the entrance to said card holder and having a knife edge and a latching recess thereon; resilient means normally urging said pivotally mounted member toward a position where said knife edge is effective; a pivotally mounted hand lever having an abutment adapted to contact said pivotally mounted member; a link pivoted on the pivot for said hand lever and including a latch; resilient means biasing said latch toward said pivotally mounted member, whereby when said hand lever is moved in one direction, the abutment thereon pivots the pivotally mounted member until the latching recess on the latter receives said latch; means responsive to a record card being inserted properly in said card holder for withdrawing said latch to cause the knife edge of said pivotally mounted member to grip said card; and indicating means rendered effective by the action of said gripping means.

References Cited

UNITED STATES PATENTS 2,607,421 8/1952 Anderson.
3,214,092 10/1965 Coyle et al.
3,220,292 11/1965 Robak et al.

GERALD A. DOST, *Primary Examiner.*